United States Patent [19]
Nicklos et al.

[11] Patent Number: 5,583,710
[45] Date of Patent: Dec. 10, 1996

[54] DISK DRIVE HAVING AN AUTOMATIC SPINDLE MOTOR LOADING MECHANISM

[75] Inventors: Carl F. Nicklos, Ogden; David E. Jones, Layton; Edward L. Rich, Ogden; Allen T. Bracken, Layton; Harold Woods, Ogden; Clark Bruderer, Farmington, all of Utah

[73] Assignee: Iomega Corporation, Roy, Utah

[21] Appl. No.: 438,255

[22] Filed: May 10, 1995

[51] Int. Cl.⁶ .................................................. G11B 17/00
[52] U.S. Cl. ........................................ 360/71; 360/99.07
[58] Field of Search ................................ 360/71, 69, 75, 360/99.07, 98.05

[56] References Cited

U.S. PATENT DOCUMENTS

| | | | |
|---|---|---|---|
| 4,419,703 | 12/1983 | Gruczelak et al. | 360/99.06 |
| 4,482,993 | 11/1984 | Agostini | 369/263 |
| 4,571,646 | 2/1986 | Bauck et al. | 360/99.09 |
| 4,599,769 | 7/1986 | Latzko et al. | 29/26 A |
| 4,644,521 | 2/1987 | Davis et al. | 369/291 |
| 4,656,542 | 4/1987 | Shibata | 360/99.02 |
| 4,663,677 | 5/1987 | Griffith et al. | 360/71 |
| 4,683,506 | 7/1987 | Toldi et al. | 360/105 |
| 4,745,500 | 5/1988 | Davis | 360/97.01 |
| 4,823,214 | 4/1989 | Davis | 360/97.01 |
| 4,953,042 | 8/1990 | Yoshikawa | 360/96.5 |
| 5,025,436 | 6/1991 | Crain et al. | 369/77.2 |
| 5,056,078 | 10/1991 | Carey et al. | 369/77.2 |
| 5,107,484 | 4/1992 | Kawamura et al. | 369/244 |
| 5,204,793 | 4/1993 | Plonczak | 360/97.01 |
| 5,317,464 | 5/1994 | Witt et al. | 360/99.08 |

FOREIGN PATENT DOCUMENTS

WO93/18507 9/1993 WIPO.

OTHER PUBLICATIONS

Minico® M 2000 RS Carbon Potentiometer Resistor Series Technical and Safety Data Sheets, W. R. Grace & Co., 1994.

*Primary Examiner*—Aristotelis Psitos
*Assistant Examiner*—James T. Wilson
*Attorney, Agent, or Firm*—Woodcock Washburn Kurtz Mackiewicz & Norris

[57] ABSTRACT

A disk drive for writing and reading data to and from a disk contained in a cartridge which is inserted through an opening into the disk drive comprises a motor ring rotatably mounted in the disk drive and a spindle motor for rotating the disk. The spindle motor is mounted in the motor ring such that rotation of the motor ring moves the spindle motor into and out of engagement with the hub of the disk cartridge. A position transducer provides an output signal indicative of the rotational position of the motor ring. A load/eject motor controls the rotation of the motor ring in response to the output signal from the position transducer.

26 Claims, 14 Drawing Sheets

DISK DRIVE HAVING AN AUTOMATIC SPINDLE MOTOR LOADING MECHANISM

BACKGROUND

1. Field of the Invention

The present invention relates to disk drives of the type that accept removable disk cartridges, and more particularly, to a disk drive having a mechanism for automatically loading a spindle motor, i.e., moving the spindle motor into engagement with the hub of a disk cartridge upon insertion of the disk cartridge into the drive.

2. Description of the Prior Art

Removable disk cartridges for storing digital electronic information typically comprise an outer casing or shell that houses a rotatable recording medium, or disk, upon which electronic information can be stored. The cartridge shell often comprises upper and lower halves that are joined together to house the disk. The disk is mounted on a hub that rotates freely within the cartridge. When the cartridge is inserted into a disk drive, a motor-driven spindle in the drive must engage the hub in order to rotate the disk(s) within the cartridge.

Standard floppy disk drives typically employ a mechanism that guides the disk cartridge as it is inserted into the drive so that the hub of the disk is brought downwardly into engagement with a fixed, rotatable spindle. These drives must be of sufficient height to accommodate the vertical movement of the floppy disk.

A more preferable solution is to provide a straight insertion path for the cartridge and to move the spindle motor into engagement with the hub of the cartridge. Published International Application No. WO 93/18507, U.S. Pat. No. 5,317,464 (Witt et al.) and U.S. Pat. No. 4,663,677 (Griffith et al.), the latter of which is assigned to the same Assignee as the present invention, all describe removable cartridge disk drives in which the spindle motor is moved vertically into engagement with the hub of a disk cartridge upon insertion of the cartridge into the disk drive. In each case, movement of the spindle motor is effected through a complex series of mechanical linkages. The complexity of such mechanical linkages increases the manufacturing costs of the disk drive. Moreover, each of these prior art disk drives requires manual operation by the user. For example, in both U.S. Pat. No. 4,663,677 and Published International Application No. WO 93/18507, the spindle motor is brought into engagement with the disk cartridge by the manual operation of a lever disposed on the front of the drive chassis. Movement of the lever is translated into movement of the spindle motor by a series of linkages, cams and gears. In U.S. Pat. No. 5,317,464, the manual closure of a drive door is translated through a series of linkages and gears into vertical movement of the spindle motor.

U.S. Pat. No. 4,482,993 discloses a compact disk player that employs a motor driven cam member to move the spindle motor of the drive vertically into engagement with the central hub of a compact disk. The loading mechanism is not designed for use with disk cartridges of the type described above. Rather, the disclosed drive is designed to receive standard compact disks that are not contained within a cartridge housing. An opto-electronic switch detects insertion of a compact disk into the drive and activates the motor driven cam member in order to move the spindle into engagement with the disk hub. As the cam mechanism brings the spindle motor into engagement with the disk hub, the mechanism contacts a mechanical switch that deactivates the cam mechanism. Activation of an ejection button causes the motorized cam mechanism to be reactivated, thereby lowering the spindle motor.

Unfortunately, the mechanism disclosed in the aforementioned patent is bulky and requires the drive to be exceedingly tall in order to accommodate the loading mechanism. Additionally, the drive cannot sense or determine the relative position of the spindle motor or cam member at all times. These and other disadvantages make the loading mechanism of this patent impractical for use in a compact, reduced height disk drive designed for use with removable disk cartridges.

In view of the foregoing, there is a need for an improved spindle motor loading mechanism that is more compact, cost effective and precise, and that does not require manual operation of a lever, or the like, in order to bring the spindle motor into engagement with a disk cartridge. The present invention satisfies this need.

SUMMARY OF THE INVENTION

The present invention is directed to a disk drive for writing and reading data to and from a disk contained in a cartridge which is inserted through an opening into said disk drive, and more particularly, to a disk drive having a spindle motor loading mechanism for automatically bringing a spindle motor into and out of engagement with the hub of the disk cartridge. According to the present invention, the disk drive comprises a motor ring rotatably mounted in the disk drive, and a spindle motor adapted to engage the hub of a disk(s) inserted in the drive and to rotate the disk. The spindle motor is mounted in the motor ring such that rotation of the motor ring in a first direction moves the spindle motor into engagement with the hub of the disk cartridge and opposite rotation of the motor ring moves the spindle motor out of engagement with the hub. A position transducer provides a preferably continuous output signal indicative of the rotational position of the motor ring. A load/eject motor controls the rotation of the motor ring in response to the output signal from the position transducer. The disk drive may include a controller for controlling the load/eject motor in response to the output signal of the position transducer.

In a preferred embodiment, the position transducer comprises an elongate resistive ink trace printed on a surface within the disk drive and having first and second ends, the first end of the resistive ink trace being connected to a voltage source and the second end being connected to a ground potential. A contact element is fixedly mounted on the motor ring and positioned thereon in sliding contact with the resistive ink trace, between the first and second ends thereof. The contact element operates to slide between the first and second ends of the resistive ink trace as the motor ring rotates between engaged and disengaged positions of the spindle motor. A voltage signal at the contact element defines the output signal of the position transducer and is indicative of the rotational position of the motor ring.

The disk drive may further comprise a spring coupled to the motor ring for biasing the motor ring in the first direction of rotation, and a cartridge eject lever pivotally mounted in the disk drive. The cartridge eject lever engages a pin on the motor ring when a cartridge is not inserted in the disk drive to prevent rotation of the motor ring in the first direction under force of the spring. The lever is pushed out of engagement with the guide pin of the motor ring when a cartridge is inserted into the disk drive thereby allowing the motor ring to rotate automatically in the first direction to an intermediate position under force of the spring. The controller receives the output signal from the position transducer, which is indicative of the intermediate position of the motor ring, and, in response, activates the load/eject motor in order to continue rotating the motor ring from the intermediate position to a fully loaded position in which the spindle motor engages the hub of the disk in the cartridge.

Still further, either the motor ring or a housing of the spindle motor preferably has a plurality of pins extending therefrom, and the other component has a plurality of cam slots for receiving the pins. The pins operate to follow the cam slots as the motor ring rotates in order to translate the spindle motor vertically into and out of engagement with the hub of the disk cartridge.

Preferably, the load/eject motor is operatively coupled to the motor ring via a gear train that translates movement of the load/eject motor into rotation of the motor ring. In a preferred embodiment, the motor ring has a load cam surface and an eject cam surface, and a final gear of the gear train has a drive pin that engages the load cam and eject cam surfaces at respective angles of rotation of the final gear in order to rotate the motor ring in the first and opposite directions, respectively.

Additional features and advantages of the present invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF THE PREFERRED EMBODIMENT

Figure 1:
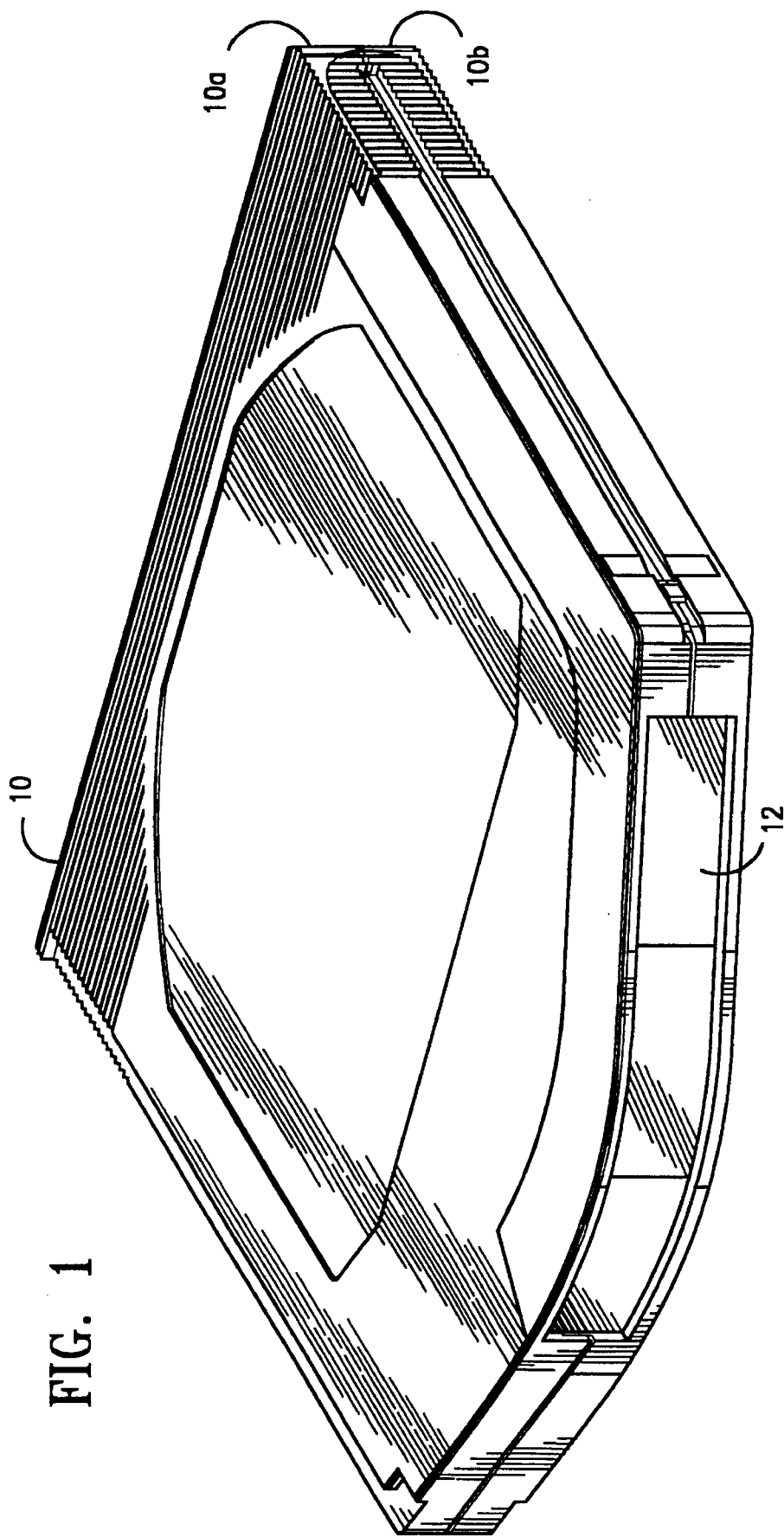
FIG. 1 is a disk cartridge adapted for use in the disk drive of the present invention.

Referring to the drawings wherein like numerals indicate like elements throughout, there is shown in FIG. 1 a disk cartridge 10 for use with the disk drive of the present invention. As shown, the disk cartridge 10 comprises an outer casing consisting of upper and lower shells 10a, 10b, respectively. Preferably, the upper and lower shells 10a, 10b are formed of a rigid plastic material. In the present embodiment, the disk cartridge 10 contains two recording disks that are attached, in stacked relation, to a common hub (not shown) rotatably mounted within the outer casing. A door 12 on the casing provides access to the recording disks by the read/write heads of a disk drive. In the present embodiment, the recording disks comprise rigid magnetic media, however, other recording media may be employed, such as floppy magnetic media or optical media.

Figure 2:
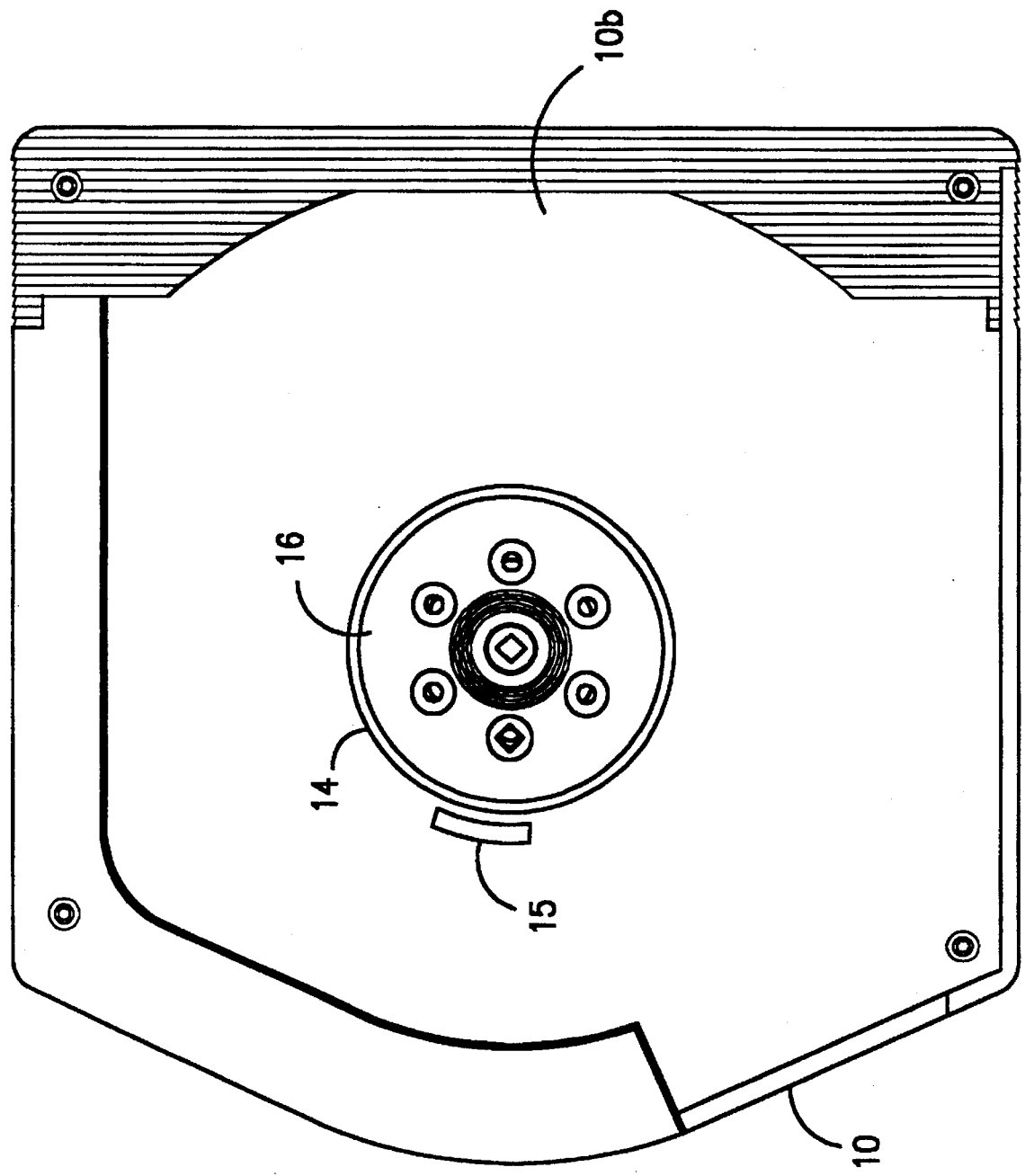
FIG. 2 is a bottom view of the disk cartridge of FIG. 1.

FIG. 2 is a bottom view of the disk cartridge 10 of FIG. 1. As shown, the bottom shell 10b of the outer casing has an opening 14 that provides access to the common hub 16 of the recording disks within the cartridge 10. As described hereinafter, the hub 16 engages a spindle motor of the disk drive through the opening 14 in order to rotate the recording disks at relatively high speeds. A slot 15 in the bottom shell engages a retaining tang (not shown) on the spindle motor housing to position the cartridge precisely within the drive.

Figure 3:
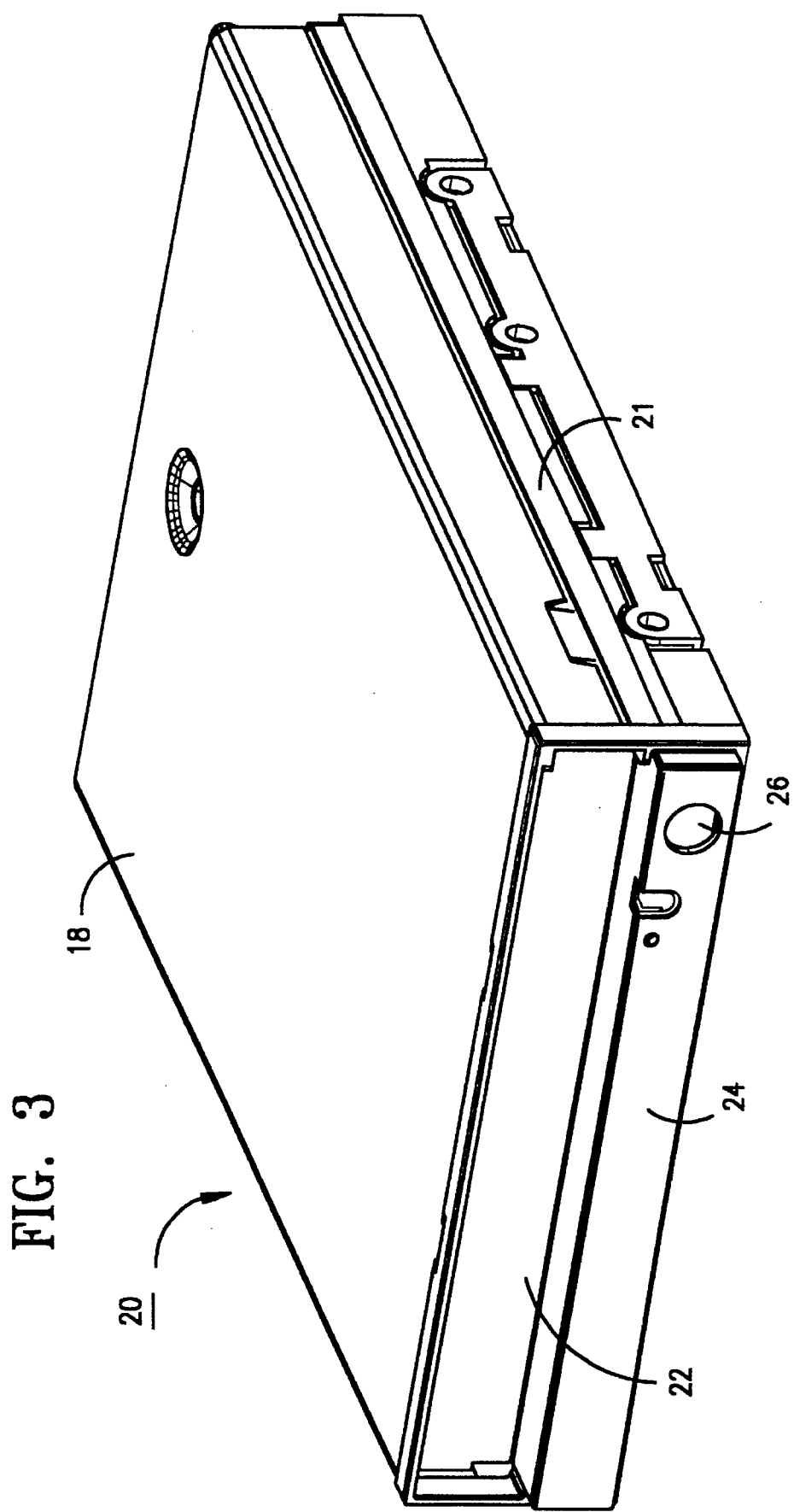
FIG. 3 is a perspective view of a disk drive in accordance with a preferred embodiment of the present invention.

FIG. 3 shows a preferred embodiment of a disk drive 20 according to the present invention for receiving the cartridge 10 of FIGS. 1 and 2. The disk drive 20 comprises an outer housing 18 that is attached to a rigid chassis 21. A front panel 24 is attached to a forward end of the chassis 21. The disk cartridge 10 is inserted into the disk drive 20 through an elongate, horizontal opening 22 in the front panel 24. An eject button 26 is provided on the front panel 24 for automatically ejecting a disk cartridge from the disk drive 20, as described hereinafter. In the embodiment shown, the disk drive 20 is configured for insertion into the housing of a computer system, such as a personal computer. However, the disk drive 20 can also be employed as a stand-alone unit. Preferably, the front panel 24 is formed of plastic, and the housing 18 and drive chassis 21 are formed of metal, although other suitable materials may be employed.

Figure 3A:
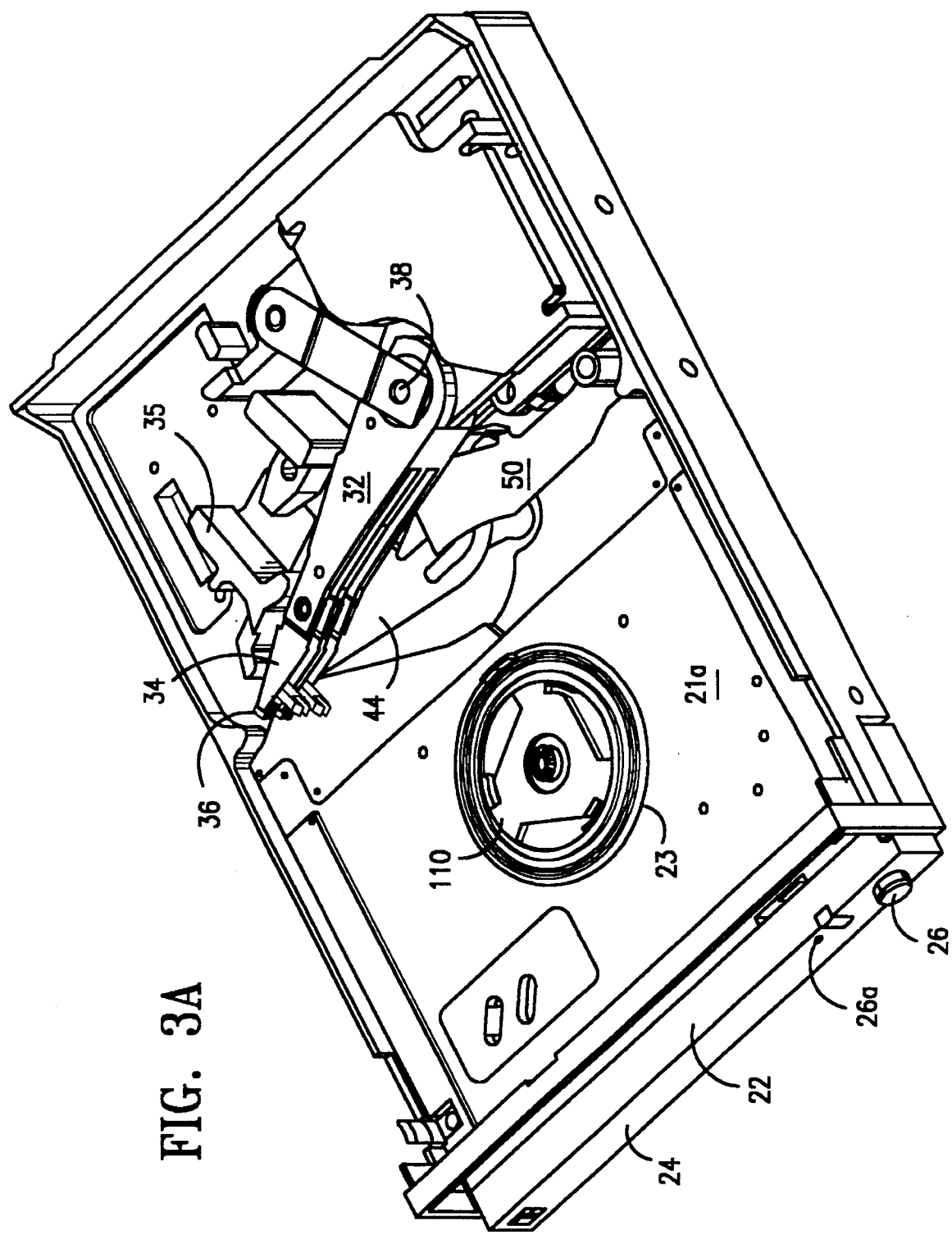
FIG. 3A is a perspective view of the disk drive of FIG. 3 with its outer housing removed to expose the drive chassis and various components mounted thereon.

FIG. 3A is a perspective view of the disk drive 20 of FIG. 3 with the housing 18 removed. As shown, a number of components are mounted on the upper surface 21a of the drive chassis 21. For example, an actuator arm 32, which forms part of a radial arm voice coil actuator, is pivotally mounted to the drive chassis 21 at 38. The actuator arm 32 has a plurality of suspension arms 34 at its distal end that each carry a read/write head 36 for recording and reading information to and from respective surfaces of the recording disks of cartridge 10. A voice coil element 42 is affixed to the other end of the actuator arm 32 for controlling the rotational movement of the arm 32. A head loading mechanism 35 facilitates loading of the magnetic heads onto the disk surfaces. Additional details of the actuator and head loading mechanism are provided in co-pending, commonly assigned, U.S. patent application Ser. No. 08/438,254, filed May 10, 1996, entitled "Head Loading Mechanism for a Disk Drive" and in co-pending, commonly assigned, U.S. patent application Ser. No. 08/377,033, filed Jan. 23, 1995, entitled "Compliant Anchor for Securing Disk Drive Actuator Bearing", both of which are incorporated herein by reference.

As further shown, a head park lever 44 and a cartridge eject lever 50 are each pivotally mounted to the drive chassis. The operation of these levers 44, 50 is described hereinafter. As also described hereinafter, a spindle motor 110 and its housing 112 are mounted in a motor ring (not shown) on the underside of the drive chassis 21. The motor ring operates to translate the spindle motor vertically through an opening 23 in the drive chassis 21 in order to engage the hub 16 of the disk cartridge 10.

Figure 4A:
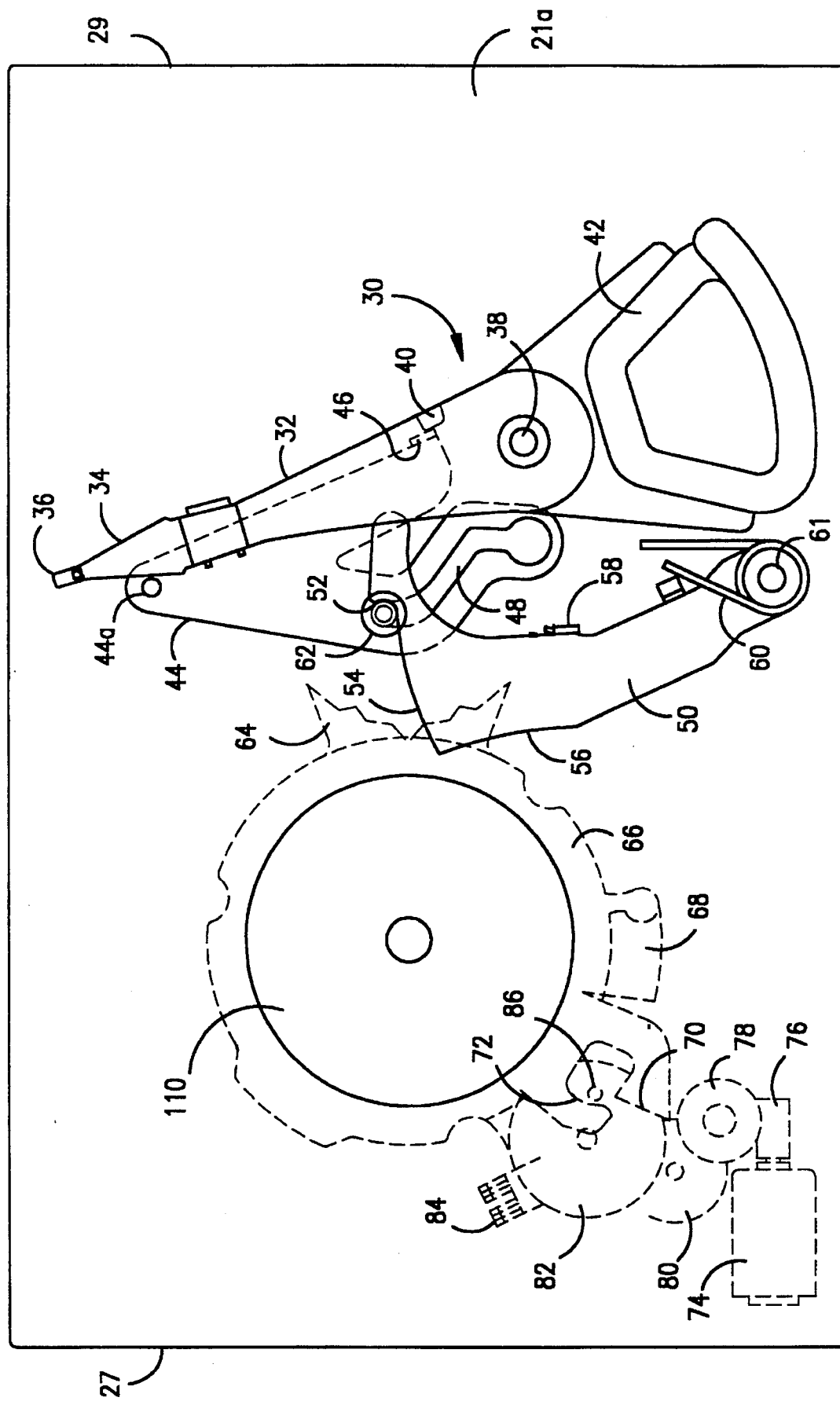
FIGS. 4A–B are top and bottom views, respectively, of the drive chassis of FIG. 3A showing the spindle motor loading mechanism of the present invention in a fully unloaded state.
Figure 4B:
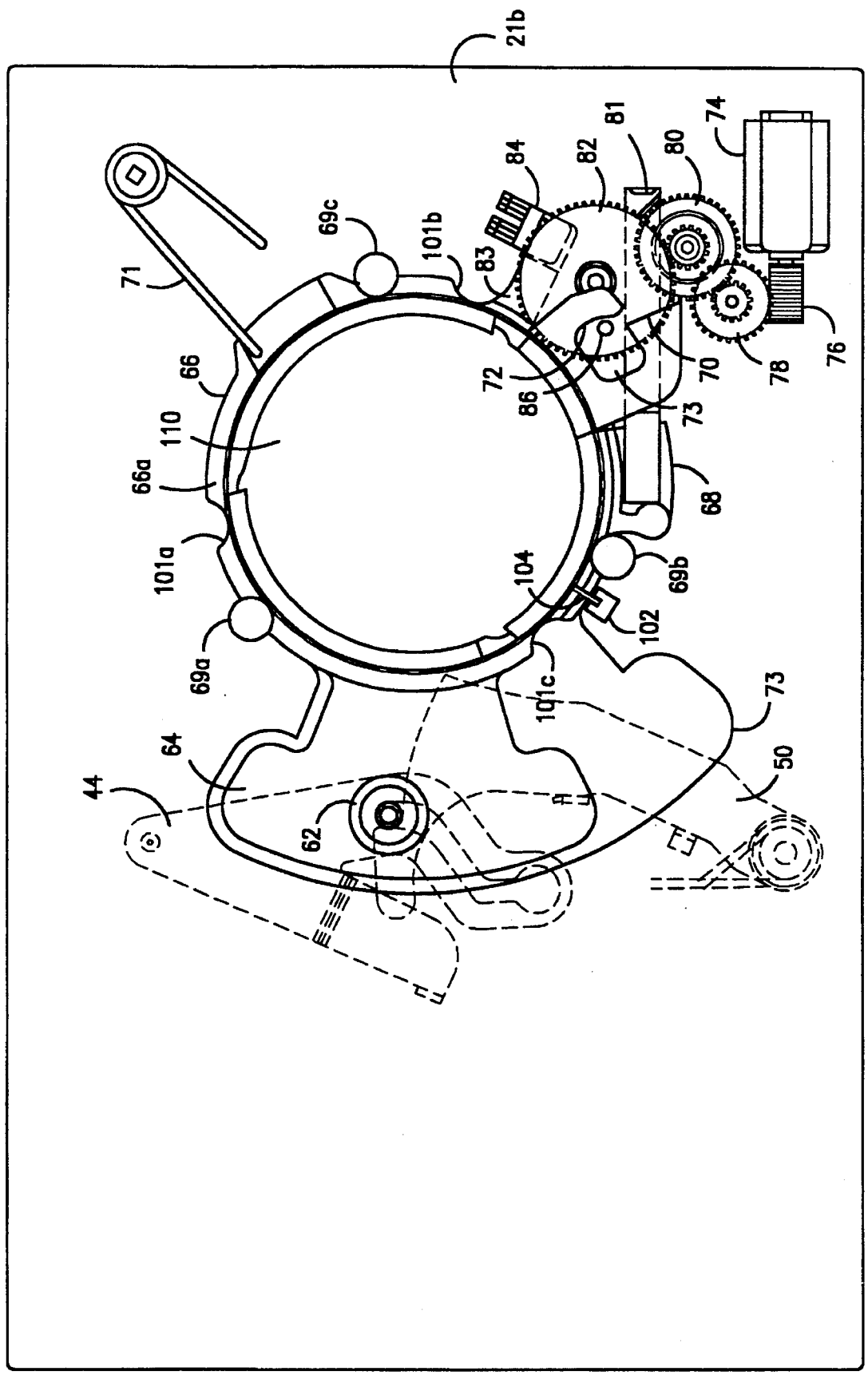

FIGS. 4A–B show top and bottom views, respectively, of the disk drive of FIG. 3A and illustrate, in particular, a spindle motor loading mechanism in accordance with a preferred embodiment of the present invention. The spindle motor loading mechanism of the present invention comprises, generally, a spindle motor 110 and corresponding housing 112, a motor ring 66, a motor ring position transducer 87 (FIG. 8), a motor ring spring 71, a load/eject motor 74 and associated gear train 76–82, and the head park and cartridge eject levers 44, 50 mentioned above. The spindle motor loading and unloading mechanism of the present invention functions to (1) move the spindle motor into engagement with the hub of the disk cartridge upon insertion of the disk cartridge into the disk drive, (2) unlock the actuator arm of the radial arm voice coil actuator once the spindle motor is engaged, (3) disengage the spindle motor from the cartridge and eject the cartridge from the disk drive when the eject button on the front panel 24 of the disk drive is depressed and (4) move the actuator arm into a retracted, parked position as the cartridge is ejected from the disk drive.

FIGS. 4A and 4B illustrate the position of the head park lever 44, cartridge eject lever 50 and radial arm voice coil actuator 30 when the drive is not in use, i.e., no cartridge has been inserted in the drive. As shown, the cartridge eject lever 50 is pivotally mounted to the upper surface 21a of the drive chassis 21. A spring 60 biases the eject lever 50 toward the insertion end 27 (i.e., front) of the drive chassis 21. A catch 52 formed at the distal end of the eject lever 50 engages a pin 62 that is attached to a portion of the motor ring 66 on the underside 21b of the drive chassis. When the motor ring 66 is in the position shown in FIG. 4A, the pin 62 prevents the eject lever 50 from springing further toward the insertion end 27 of the disk cartridge.

The eject lever 50 has a dwell cam surface 54 and a second cam surface 56 that, as described hereinafter, slide over the pin 62 of the motor ring 66 during various stages of rotation of the motor ring 66. In the position shown in FIG. 4A, the dwell cam surface 54 contacts the pin 62 and thereby prevents the motor ring 66 from rotating toward the pivoted end 61 of the eject lever 50, i.e., clockwise in FIG. 4A (counter-clockwise when viewed in FIG. 4B).

A cartridge push tab 58 on the eject lever 50 engages the forward end face of a disk cartridge, e.g. cartridge 10, when the cartridge is inserted into the disk drive through the insertion opening 22 in the front panel 24 of the drive. Continued insertion of the disk cartridge causes the eject lever 50 to pivot toward the rear end 29 of the disk drive against the force of spring 60. This loads the spring 60. As the eject lever 50 pivots toward the rear end 29 of the disk drive, the dwell cam surface 54 will slide along the pin 62 until it moves just past the pin 62, thereby releasing the pin 62 and allowing the motor ring 66 to rotate, as described more fully below.

The head park lever 44 is pivotally mounted to the upper surface 21a of the drive chassis 21 at 44a. Movement of the head park lever 44 is controlled by movement of the motor ring pin 62 along a contoured groove 48 in the head park lever 44. As the motor ring 66, and hence pin 62, rotate clockwise in FIG. 4A (counter-clockwise when viewed from below in FIG. 4B), the pin 62 will engage the contoured surfaces of groove 48 causing the head park lever to swing toward the insertion end 27 of the disk drive. Movement of the motor ring 66 in the opposite direction will cause the head park lever 44 to move back to the position illustrated in FIG. 4A.

The head park lever 44 has a push back tab 46 positioned to engage a mating projection 40 formed on the actuator arm 32. In the position shown in FIG. 4A, the push back tab 46 of the head park lever 44 prevents the actuator arm 32 from rotating toward the insertion end 27 of the disk drive, i.e., the actuator arm 32 is in a "parked" position. Movement of the head park lever 44 toward the insertion end 27 of the disk drive will, of course, move the push back tab 46 away from the actuator arm 32, allowing the actuator arm 32 to move toward the insertion end 27 of the drive in order to load the read/write heads 36 at the end of the actuator arm 32 onto the recording disks of the cartridge 10.

FIG. 4B shows the underside 21b of the drive chassis 21 and provides additional details of the spindle motor loading mechanism of the present invention, including the motor ring 66, load/eject motor 74 and gear train 76–82. The motor ring 66 is rotatably mounted on the underside 21b of the drive chassis 21 via three flat-headed pins 69a–c that capture a retaining shoulder 66a that extends around the base of the motor ring 66. Access pockets 101a–c are formed in the retaining shoulder 66a to facilitate assembly of the motor ring 66 to the drive chassis 21. The motor ring 66 is mounted by aligning the access pockets 101a–c with the flat-headed pins 69a–c, pressing the motor ring 66 against the underside 21b of the drive chassis 21, and then rotating the motor ring 66 into position so that the flat-headed pins 69a–c capture respective portions of the retaining shoulder 66a.

The motor ring 66 has an enlarged seal flange 64 that rides in a recessed portion 73 of the drive chassis 21 as the motor ring 66 rotates back and forth. In the present embodiment, the motor ring 66 rotates back and forth through a 20.6 degree arc. The aforementioned pin 62 of the motor ring 66 is affixed (e.g., riveted) to the enlarged flange 64, and, as mentioned above, extends through an elongate opening (not shown) in the drive chassis to engage the groove 48 of the head park lever 44 and the dwell cam and second cam surfaces 54, 56 of the eject lever 50 on the opposite side of the chassis 21. The elongate opening (not shown) in the chassis must be sufficiently long and wide to allow the pin 62 to move through the entire 20.6 degree arc of the motor ring 66. The seal flange 64 blocks off the opening (not shown) in the drive chassis 21 over the full travel of the motor ring 66 to reduce contamination flow in the drive. A spring 71 biases the motor ring 66 in the counter-clockwise direction (as viewed in FIG. 4B). The motor ring is preferably formed (e.g., injection molded) of a plastic material.

The motor ring 66 has a load cam surface 72 and an eject cam surface 70 that engage a drive pin 86 on a final gear 82 of the gear train 76–82 in order to rotate the motor ring 66 during cartridge load and eject operations, as more fully described hereinafter. The motor ring has a heat stake mounting platform 83 on which a contact 84 is mounted. The contact 84 forms part of a position transducer, described hereinafter. A power down cam 68 is provided on the motor ring 66 so that the motor ring 66 can be manually rotated in the event of a power failure. The cam 68 is operated by a simple drop-in lever 81 that a user can access with a paper clip through an opening 26*a* (FIG. 3) in the front panel of the drive.

The load/eject motor 74 is rigidly mounted to the drive chassis 21 and has a spiral gear 76 mounted on its drive shaft. In the preferred embodiment, the load/eject motor is a D.C. brush type motor. A suitable motor can be obtained from Copal (USA) Inc., 2291 205th Street, Suite 105, Torrance, Calif. 90501, model no. LA10-382. Rotation of the motor drive shaft is transmitted through the spiral gear 76 and gears 78 and 80 into rotation of the final gear 82. The final gear 82 always rotates in a clockwise direction as viewed in FIG. 4B. During a cartridge load operation (i.e., insertion of a cartridge into the disk drive), the final gear 82 will rotate clockwise such that the drive pin 86 on the final gear 82 engages the load cam surface 72 of the motor ring 66 causing the motor ring 66 to rotate in a first direction, i.e., counter-clockwise. During a cartridge eject operation, the load/eject motor is turned on in order to continue rotating the final gear 82 so that the drive pin 86 contacts the eject cam surface 70 of the motor ring, causing the motor ring to rotate in the opposite direction (i.e., clockwise) back to the position illustrated in FIG. 4B. A controller (e.g., microprocessor) controls the load/eject motor in response to an output signal from a position transducer that indicates the rotational position of the motor ring 66, as described hereinafter.

Figure 5:
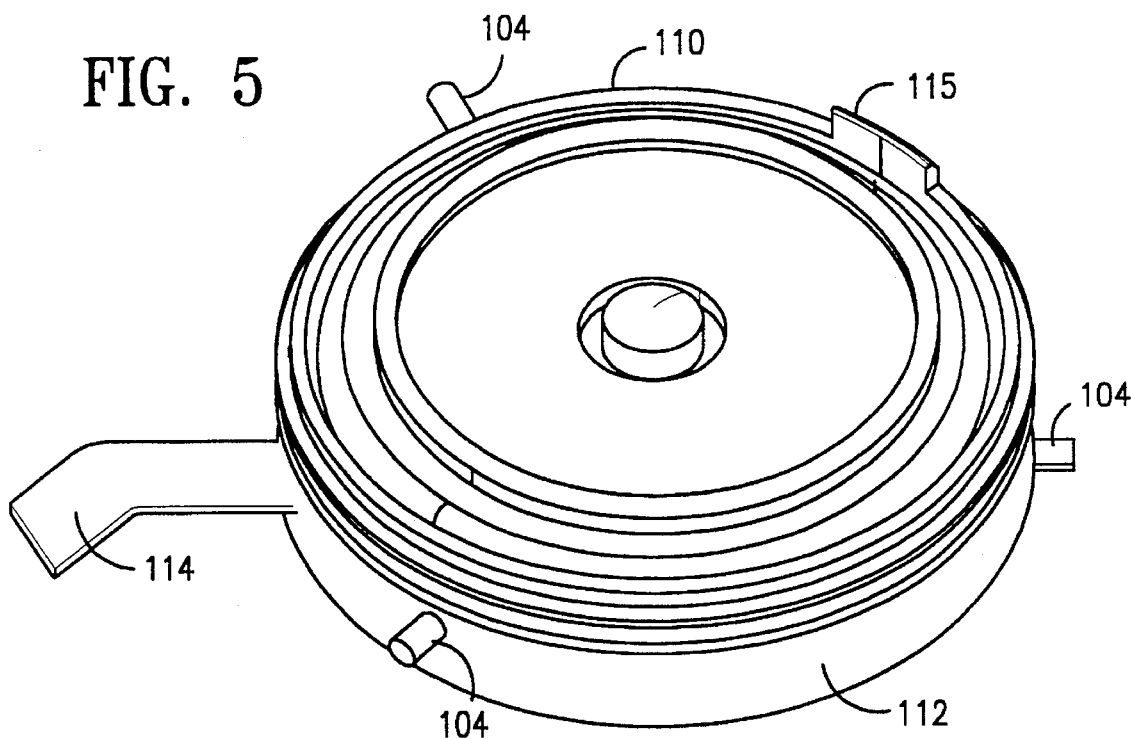
FIG. 5 is an enlarged perspective view of the spindle motor and spindle motor housing of the disk drive of the present invention.

FIG. 5 is a perspective view of the spindle motor 110 and its associated housing 112. The housing 112 of the spindle motor has a plurality of pins extending substantially radially therefrom. In the present embodiment, the housing 112 has three pins spaced equally about the circumference of the housing 112. Power is supplied to the spindle motor via a flex cable 114. A retaining tang 115 on the spindle motor housing 112 is positioned to engage the slot 15 in the bottom shell 10*b* of the cartridge 10.

FIGS. 6A–6D show further views of the motor ring 66 and provide additional details thereof. As shown, the motor ring 66 further includes a plurality of cam slots 106*a–c* that receive the corresponding pins 104 of the spindle motor housing 112 when the spindle motor is mounted in the motor ring 66. Each cam slot 106*a–c* opens to the outer edge of the motor ring 66 to allow simple vertical drop-in of the pins 104 of the spindle motor housing 112 during assembly. The pins 104 of the spindle motor housing follow the cam slots 106*a–c* of the motor ring 66 as the motor ring rotates in order to move the spindle motor into and out of engagement with the hub of the disk cartridge 10. A cutout 108 is provided in the motor ring 66 to provide clearance for the flex cable 114 of the spindle motor 110 as the motor ring 66 rotates.

Figure 7A:
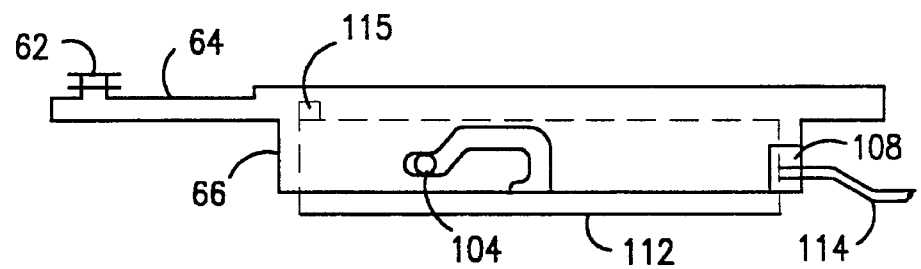
FIGS. 7A and 7B illustrate the operation of the motor ring in translating the spindle motor from a fully unloaded position to a fully loaded position.
Figure 7B:
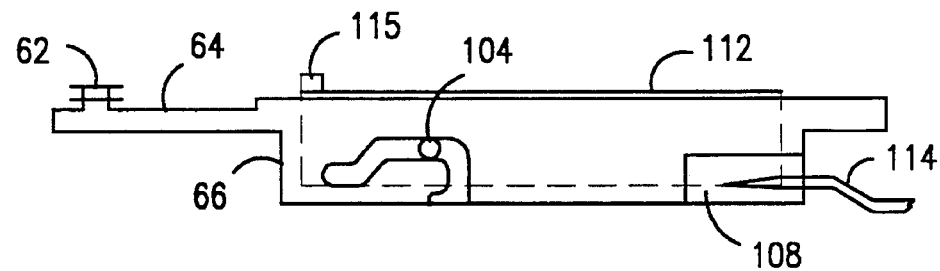
Figure 6B:
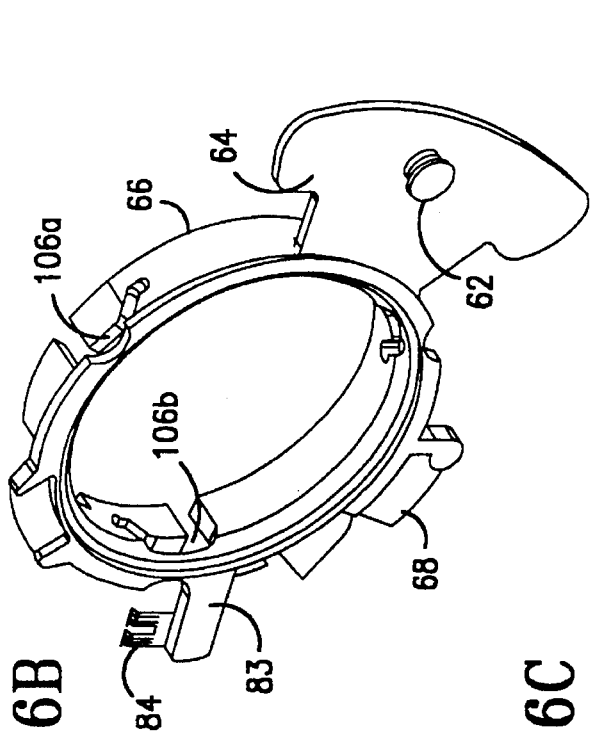
FIGS. 6A–6D show various additional views of the motor ring of FIGS. 4A–B.
Figure 6C:
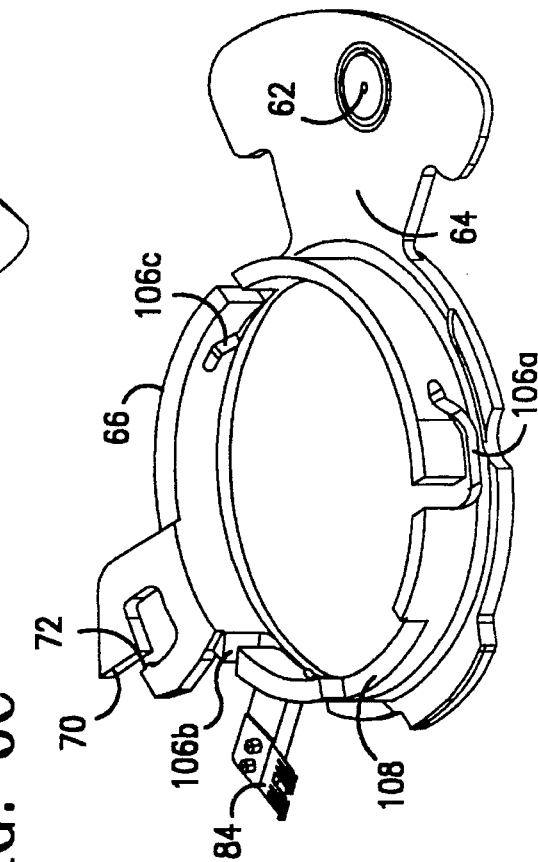
Figure 6A:
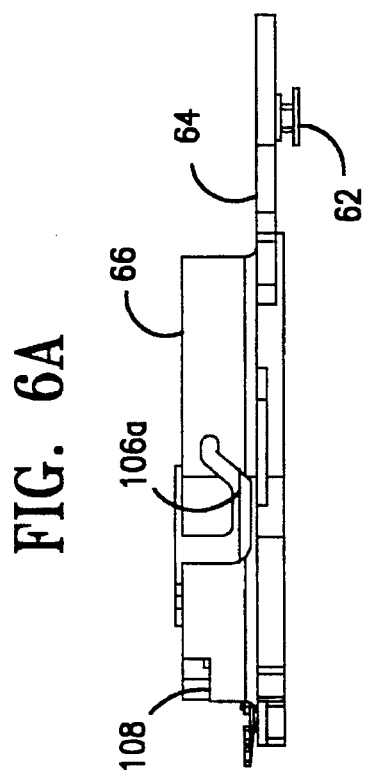
Figure 6D:
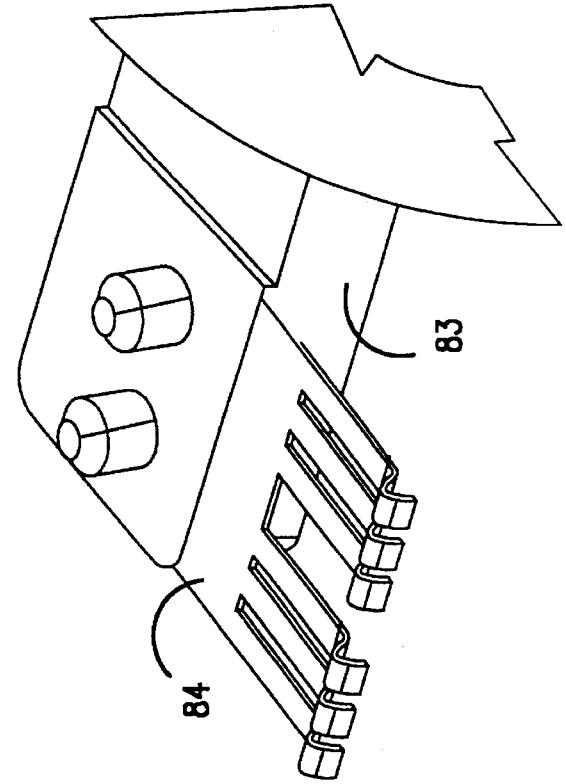

FIGS. 7A–7B illustrate the vertical translation of the spindle motor 110 and housing 112 as the motor ring 66 rotates. FIG. 7A shows the spindle motor 110 and housing 112 in a fully unloaded position, i.e., no cartridge is inserted in the drive. As shown in FIG. 7B, rotation of the spindle motor in a first direction (i.e., counter-clockwise in FIG. 4B) causes the pins 104 to follow their respective cam slots 106*a–c,* thereby translating the spindle motor 110 and housing 112 upward into engagement with the hub 16 of the disk cartridge 10. Rotation of the motor ring 66 in the opposite direction will translate the spindle motor downwardly back to the fully unloaded position of FIG. 7A. The portions of the motor ring 66 that form cantilever sections over each cam slot 106*a–c* are preloaded with a force necessary to keep the spindle motor up against a locating datum proximate the precision bore 23 in the chassis 21 when the spindle motor 110 is fully loaded and engaged with the hub of a disk cartridge.

Figure 8:
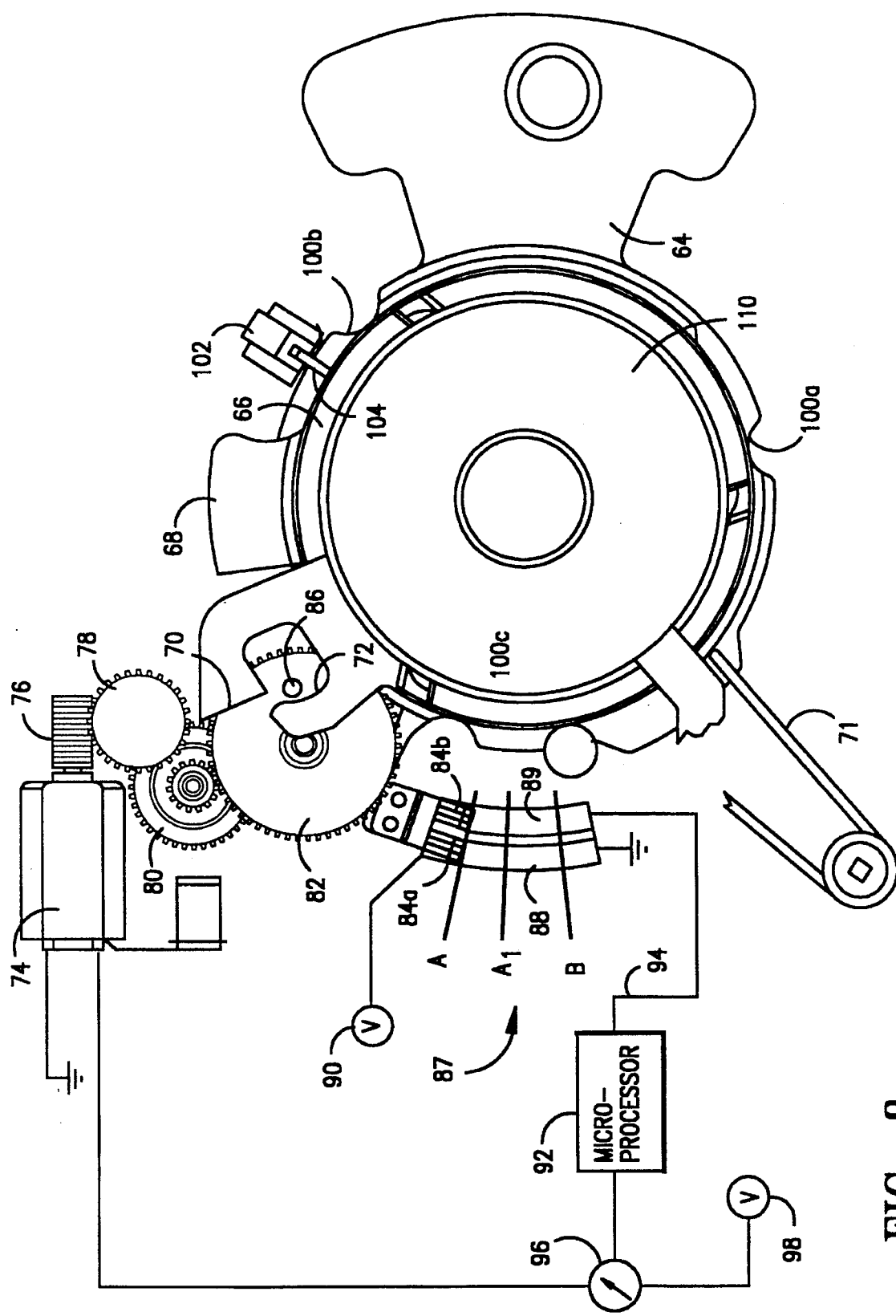
FIG. 8 is an enlarged view of the spindle motor loading mechanism of the present invention and provides additional details of a motor ring position transducer in accordance with the present invention.
Figure 9A:
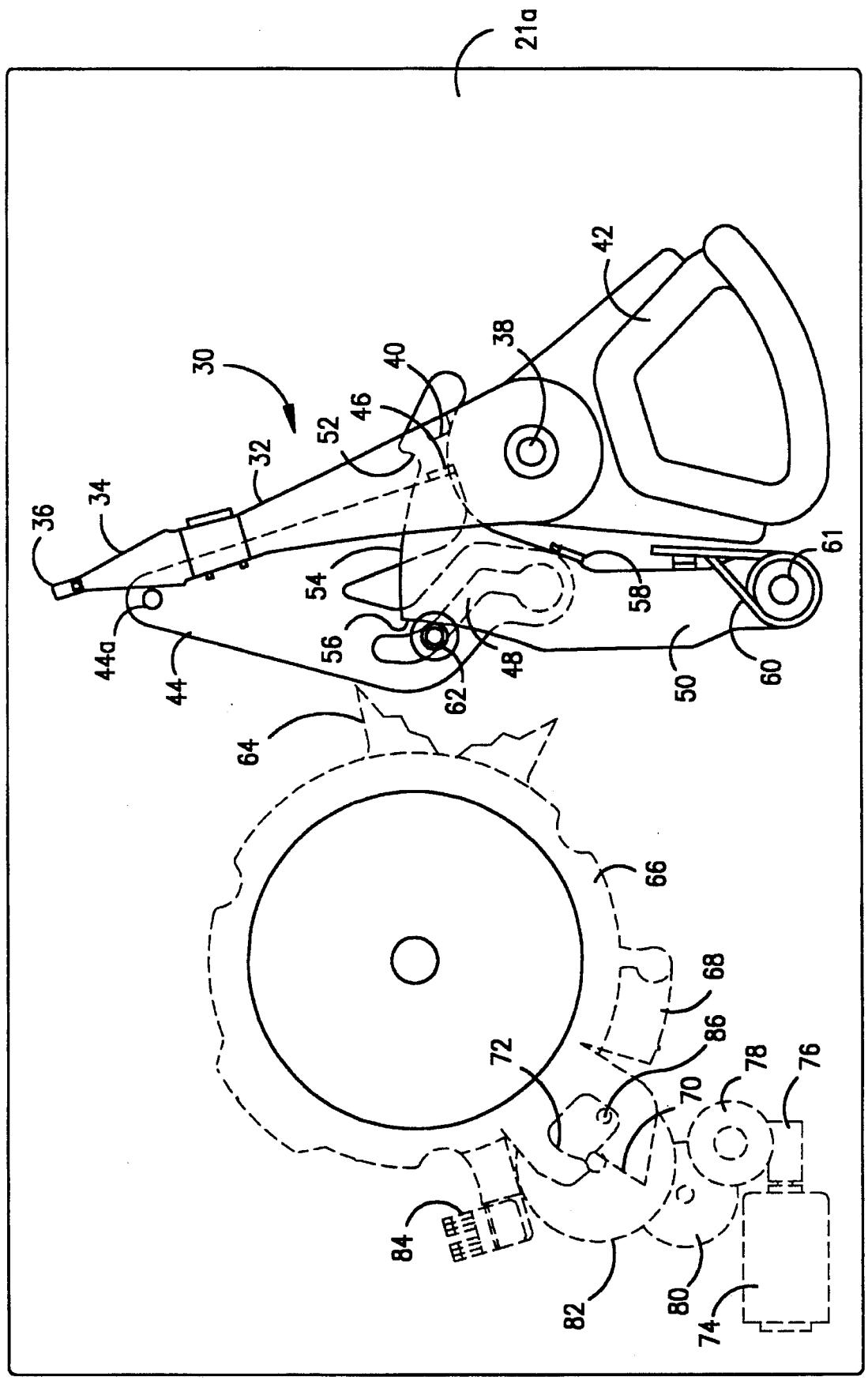
FIGS. 9A–B are top and bottom views, respectively, of the drive chassis showing the spindle motor loading mechanism of the present invention in an intermediate position between the fully unloaded state of FIGS. 4A–B and a fully loaded state.
Figure 9B:
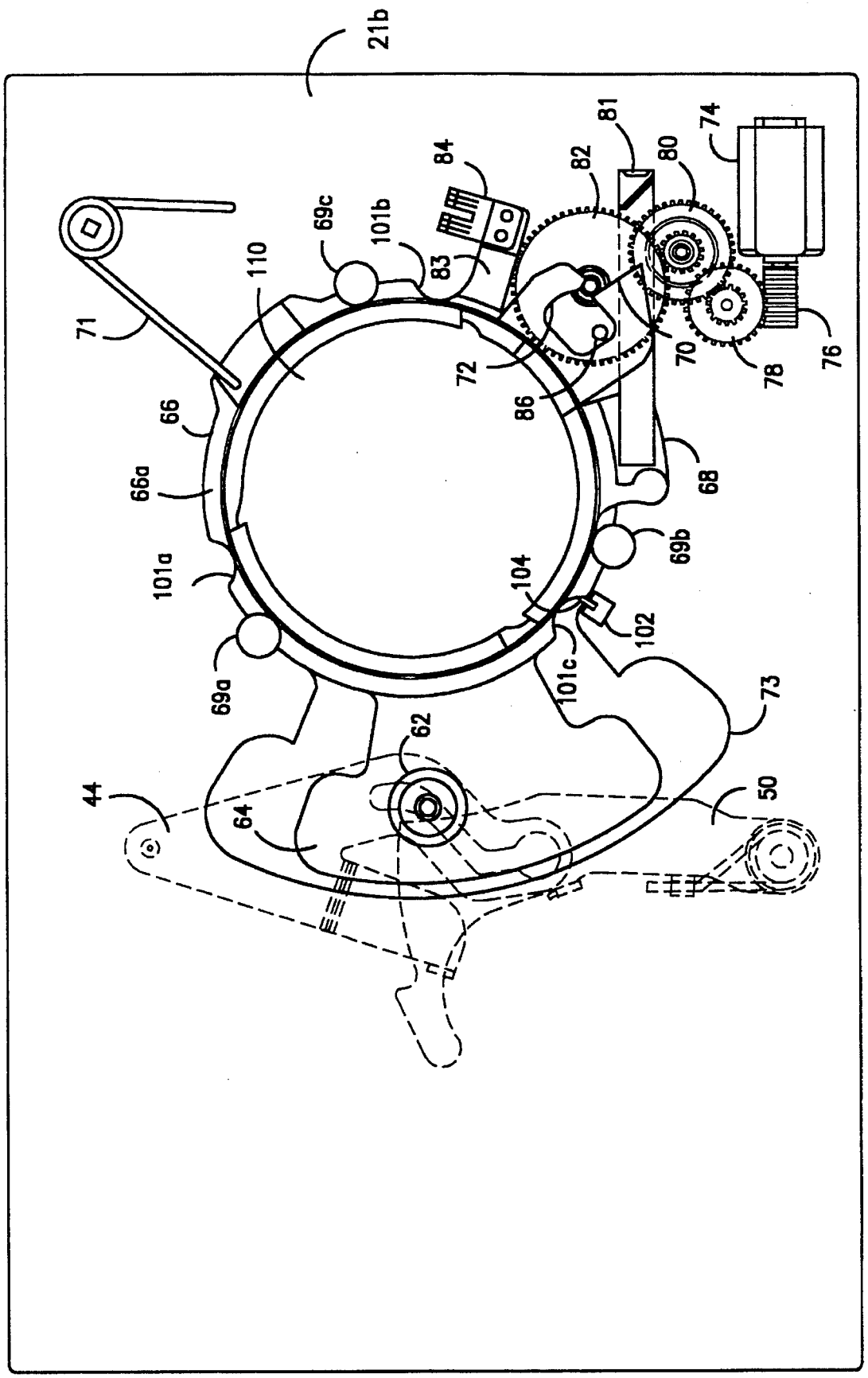
Figure 10A:
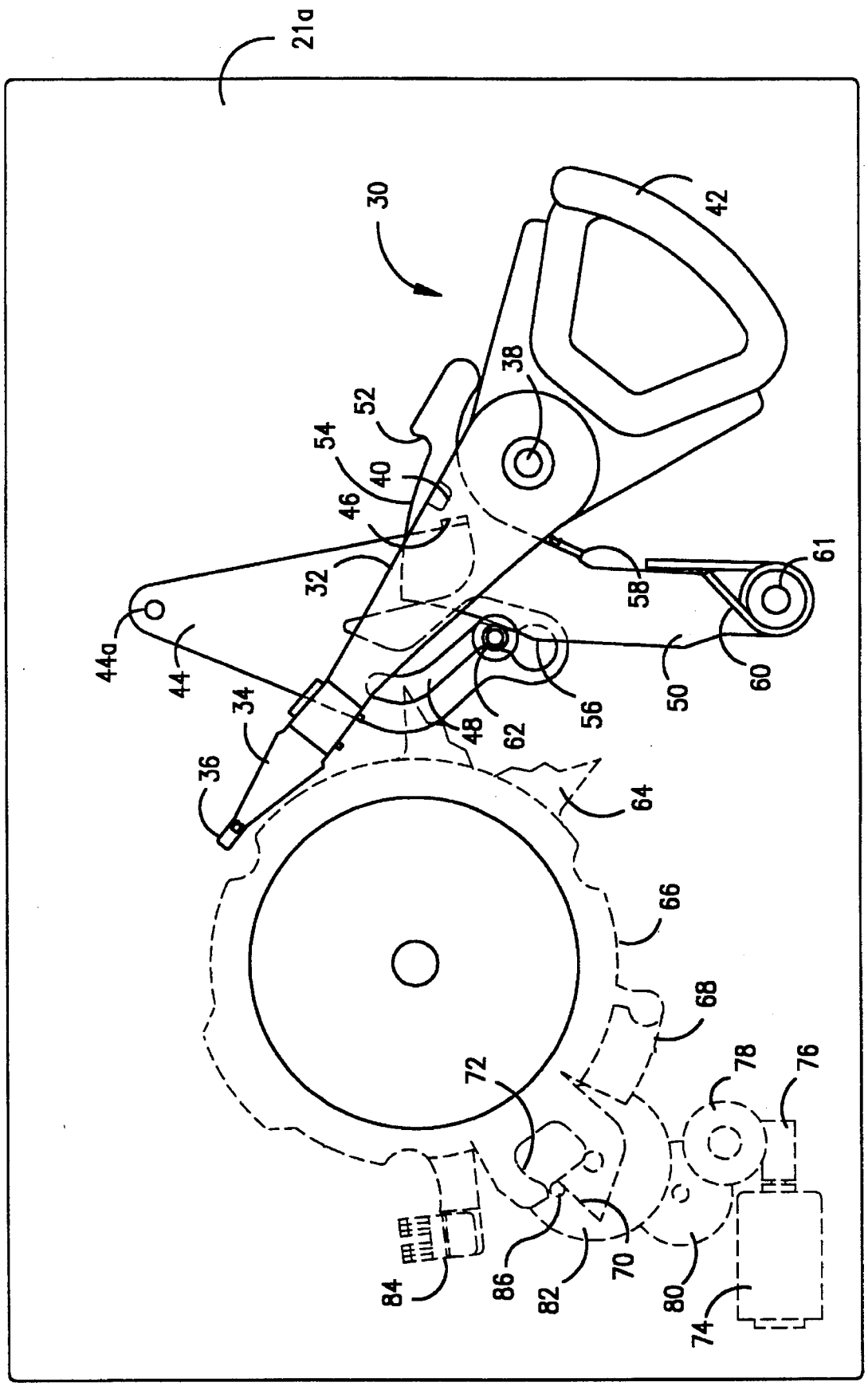
FIGS. 10A–B are top and bottom views, respectively, of the drive chassis showing the spindle motor loading mechanism of the present invention in the fully loaded state.
Figure 10B:
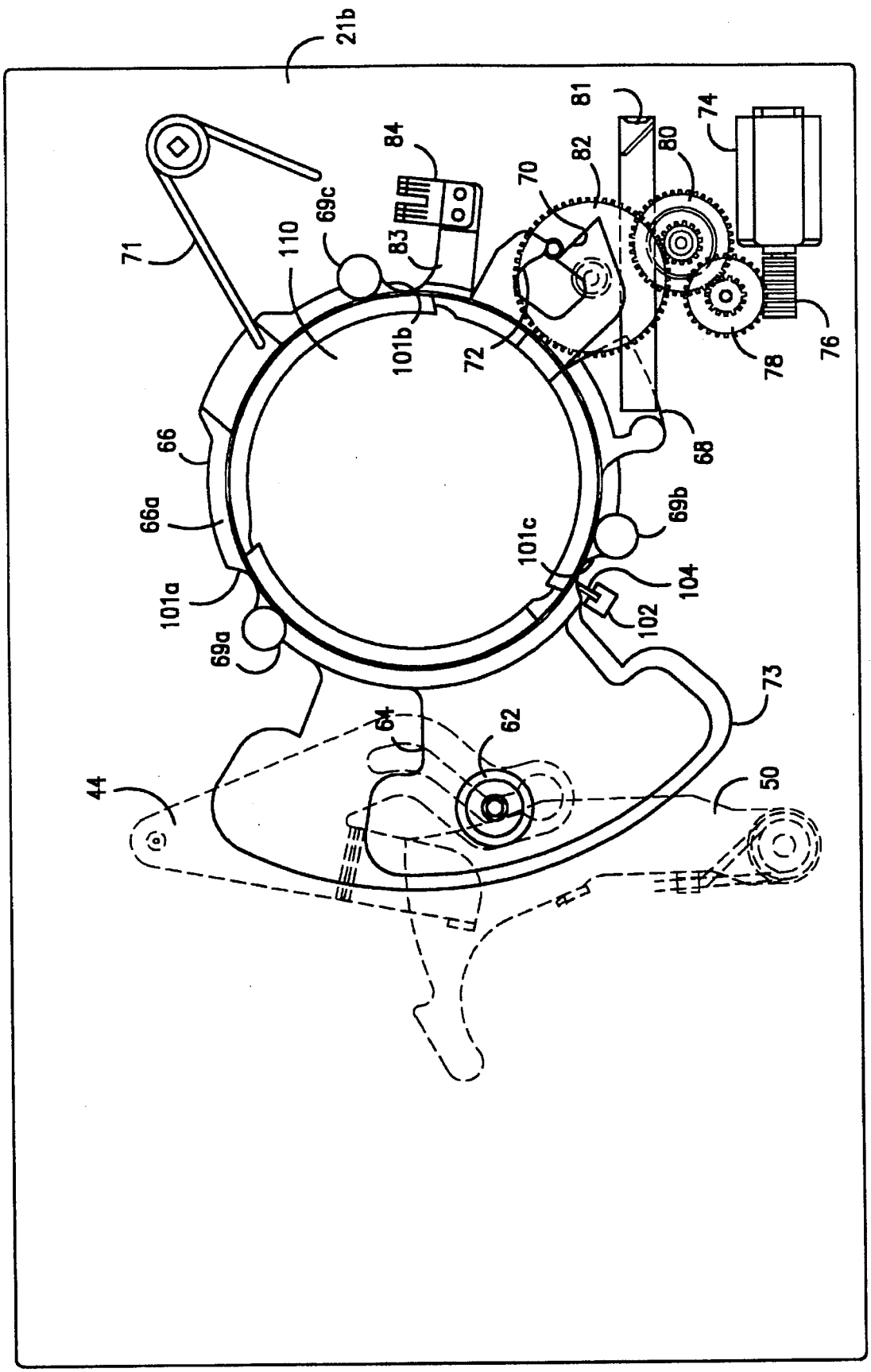

FIG. 8 is an enlarged view of the motor ring 66, load/eject motor 74 and gear train 76–82. As shown, a longest one of the pins 104 of the spindle motor housing 112 is captured by an anti-clock mechanism 102 fixedly positioned on the drive chassis 21 to prevent rotation, or clocking, of the spindle motor housing 112 when the motor ring 66 rotates. The anti-clock mechanism 102 forms a channel that restrains the pin 104 in the rotational direction, but allows the pin 104 to move vertically in the channel as the spindle motor housing 112 raises and lowers. The anti-clock mechanism 102 is preferably formed of a low-friction plastic material and is adapted to snap-fit into an aperture (not shown) in the drive chassis 21. Alternatively, the anti-clock mechanism 102 may be integrally cast with the chassis 21 and then coated with a low-friction material.

FIG. 8 further illustrates a motor ring position transducer 87 in accordance with an aspect of the present invention. The position transducer 87 generates a continuous output signal indicative of the rotational, or angular, position of the motor ring 66. As mentioned briefly above, a controller (i.e., microprocessor 92) turns the load/eject motor 74 on and off in response to the output signal from the position transducer 87.

The position transducer 87 comprises an elongate resistive ink trace 88 printed on a surface within the drive adjacent the motor ring 66. In the present embodiment, the resistive ink trace 88 is silk screened onto a printed circuit board (not shown) that is mounted on the underside 21*b* of the drive chassis 21 and carries the internal electronics of the drive. This printed circuit board provides a convenient surface proximate the motor ring 66. Alternatively, the resistive ink trace 88 can be provided on a separate, or dedicated, surface of the drive chassis 21. One end of the resistive ink trace 88 is connected to a voltage source 90 that provides a small voltage (e.g., 5.0 volts DC). The other end of the resistive ink trace 88 is connected to ground. In the preferred embodiment, the resistive ink trace 88 provides a resistance in the range of 4K to 12K ohms. A suitable resistive ink material can be obtained from GRACE Specialty Polymers, Emerson & Cuming, Inc., 77 Dragon Court, Woburn, Mass. 01888.

A conductive trace 89, formed, for example, of copper, is provided along side the resistive ink trace 88. The conductive trace 89 is connected, at one end, to an input 94 of the controller 92. A thin layer of resistive ink may, if desired, be provided on the conductive trace as well. However, the conductive trace, even with a resistive ink coating, will be highly conductive.

Both the resistive ink trace 88 and the conductive trace 89 are curved slightly to follow the arcuate motion of the contact 84 as the motor ring 66 rotates. In the preferred embodiment, the resistive ink trace 88 is approximately 16.5 mm. long, and the conductive trace 89 is approximately 11.3 mm. long. Both traces 88, 89 are approximately 5 mm. wide.

In the present embodiment, the controller 92 comprises a Motorola MCHC16Z1 microprocessor having a plurality of analog inputs that are each capable of receiving an analog voltage and converting the voltage to a digital value. One of the analog inputs is used to implement input 94.

The aforementioned contact 84, which is fixedly attached to the heat stake mounting platform 83 on the motor ring 66, forms the remainder of the position transducer 87. The contact 84 has first and second sets of prongs 84*a* and 84*b*, respectively, that are positioned on the mounting platform 83 of the motor ring 66 such that they are in sliding contact with the respective traces 88, 89. In the preferred embodiment, each set of prongs 84*a*, 84*b* comprises three closely spaced prongs. The first set of prongs 84*a* slides along the resistive ink trace 88 as the motor ring 66 rotates through its 20.6 degree arc. At the same time, the second set of prongs 84*b* of the contact 84 slides along the conductive trace 89. The conductive trace 89 serves as a connection between the contact 84 and the input 94 of the microprocessor 92.

The voltage at the contact 84 will vary as the position of the first set of contact prongs 84*a* changes due to rotation of the motor ring 66. In this respect, the operation of the position transducer 87 is similar to that of a potentiometer. The voltage at the contact 84 defines the output signal of the position transducer 87 and provides a continuous indication of the rotational, or angular, position of the motor ring 66. As described hereinafter, the microprocessor 92 senses the magnitude of the voltage at its input 94, and particularly, maximum and minimum voltage points, and controls the power to the load/eject motor 74 accordingly via switch 96 and power supply 98.

Referring to FIGS. 4A–B, 9A–B and 10A–B, the operation of the spindle motor loading mechanism of the present invention will now be described. Prior to insertion of the disk cartridge into the disk drive 20, the components of the spindle motor loading mechanism of the present invention are in the position shown in FIGS. 4A–B. The spindle motor 110 and its associated housing 112 are down below the floor (i.e., upper surface 21*a*) of the chassis 21, out of contact range with the cartridge. As the user inserts the cartridge 10 into the drive, the forward end face of the cartridge 10 contacts the cartridge push tab 58 on the eject lever 50 and pushes the eject lever rearwardly, loading the eject lever spring 60 as it goes. Before the cartridge reaches hard stops (not shown) on the chassis 21, the end of the dwell cam surface 54 of the eject lever 50 will slide past the motor ring pin 62, allowing the motor ring 66 to quickly rotate approximately 8–10 degrees to the intermediate position shown in FIGS. 9A–B under the force of motor ring spring 71. At this point, the motor ring pin 62 has moved part way down the second cam surface 56 of the eject lever 50 and has moved part way along the contoured groove 48 of the head park lever 44. However, the motor ring pin 62 has not moved far enough along the contoured groove 48 of the head park lever 44 to move the lever 44 away from the actuator arm 32, and therefore, the actuator arm 32 remains in the fully parked position.

Also in this intermediate position, the pins 104 on the spindle motor housing 112 will have moved part way up the corresponding cam slots 106*a–c* in the motor ring. This raises the spindle motor 110 and housing 112 so that the cartridge retaining tang 115 (FIG. 5) on the spindle motor housing 112 begins to engage the mating slot 15 (FIG. 2) on the bottom shell 10*b* of the cartridge 10.

The intermediate position of the motor ring 66 corresponds to position $A_1$ of the contact element 84 of the position transducer 87, as indicated in FIG. 8. The controller 92 (i.e., microprocessor) senses, at input 94, the voltage change associated with this initial motor ring rotation and switches on the load/eject motor 74. This causes the final gear 82 to rotate (clockwise in FIG. 8) such that the drive pin 86 on the final gear 82 engages the load cam surface 72 of the motor ring 66. As the final gear 82 continues to rotate, the drive pin 86 pushes the load cam surface 72 until the motor ring 66 completes its 20.6 degree arc. This position of the motor ring 66 corresponds, in FIG. 8, to position B of the position transducer 87. In the present embodiment, the load/eject motor 74 will continue to rotate the final gear 82 until it just begins to engage the eject cam surface 70 of the motor ring 66 and to move the motor ring 66 back in the opposite direction. This results in a voltage minimum output from the position transducer 87. The microprocessor 92 senses this voltage minimum at its input 94 and switches off the load/eject motor 74 in response.

The spindle motor 110 is now fully loaded, i.e., fully engaged with the hub 16 of the disk cartridge, and the cartridge retaining tang 115 on the spindle motor housing 112 fully engages the corresponding slot 15 in bottom shell of the disk cartridge 10. The components of the spindle motor loading mechanism of the present invention are now in the position shown in FIGS. 10A–B. As shown, the motor ring pin 62 has moved farther along the second cam surface 56 of the eject lever 50 thereby moving the cartridge push tab 58 out of contact with the cartridge 10, and hence, removing the ejection force of spring 60 from the cartridge 10. The motor ring pin 62 has also moved farther along the contoured groove 48 of the head park lever 44. As a result, the head park lever 44 has now moved away from the actuator arm 32, allowing the actuator arm 32 to swing toward the recording disks in the cartridge 10 and to load the magnetic heads 36 at the end of the actuator arm 32 onto the disks. Preferably, head loading is achieved in the manner described in co-pending, commonly assigned U.S. patent application Ser. No. 08/438,254, filed May 10, 1996, entitled "Head Loading Mechanism for a Disk Drive".

When it is time to remove the cartridge 10 from the disk drive 20, the user pushes the eject button 26 on the front panel 24 of the disk drive 20. The microprocessor 92 senses the activation of the eject button and, in response, parks the disk drive heads, stops the spindle motor, and turns on the load/eject motor 74. Turning on the load/eject motor 74 causes the final gear 82 of the gear train to once again begin rotating clockwise (as viewed from FIGS. 8 and 10B). As the final gear 82 rotates, the drive pin 86 on the final gear 82 pushes against the eject cam surface 70 of the motor ring, causing the motor ring to rotate in the opposite direction, back toward the position shown in FIGS. 4A–B. As the motor ring pin 62 moves back toward its initial position and along the contoured groove 48 of the head park lever 44, the head park lever 44 moves back toward the rear end 29 of the drive, forcing the actuator arm 32 back to the parked position. The magnetic heads of the disk drive will, of course, have been unloaded from the recording disks in the cartridge, preferably in the manner described in the aforementioned co-pending application Ser. No. 08/438,254.

As the motor ring 66 continues to rotate, the motor ring spring 71 meets its engagement surface on the motor ring 66 and begins to load up. The pins 104 on the spindle motor housing 112 follow the cam slots 106*a–c* causing the spindle motor 66 to translate downwardly. The retaining tang 115 on the spindle housing 112 disengages from the slot 15 in the bottom shell of the cartridge 10. As the motor ring 66 reaches the end of its 20.6 degree travel, the motor ring pin 62 passes the end of the second cam surface 56 of the eject lever 50, allowing the eject lever 56, which was significantly preloaded by spring 60, to spring toward the insertion end 27 of the drive and to push the cartridge 10 backward out of the drive. Immediately after the eject lever 50 fires, the drive pin 86 on the final gear 82 falls off the inside edge of the eject cam surface 70 and into the clearance pocket 73 formed by the eject and load cam members. This allows the motor ring 66 to spring back slightly until the motor ring pin 62 is stopped by the dwell cam surface 54 of the eject lever 50. This slight reversal of direction causes a voltage maximum point output from the position transducer 87. The microprocessor 92 senses the voltage maximum point at its input 94 and, in response, switches off the load/eject motor 74. The spindle motor loading mechanism has therefore returned to the fully unloaded position illustrated in FIGS. 4A–B.

If power happens to fail during operation, the operator can easily remove the cartridge by simply inserting a paper clip through an access hole in the front panel, and pushing until the cartridge ejects from the drive. A thin, elongate power down lever 81 extends from a point just inside the front panel of the disk drive to the power down lever cam 68 on the motor ring 66. The power down lever transmits the force of the paper clip directly to the motor ring 66 in a tangential direction, causing the motor ring 66 to undergo the same eject stroke as described above. When the drive once again receives power, the position transducer will indicate to the microprocessor 92 the present state of the mechanism.

Figure 11:
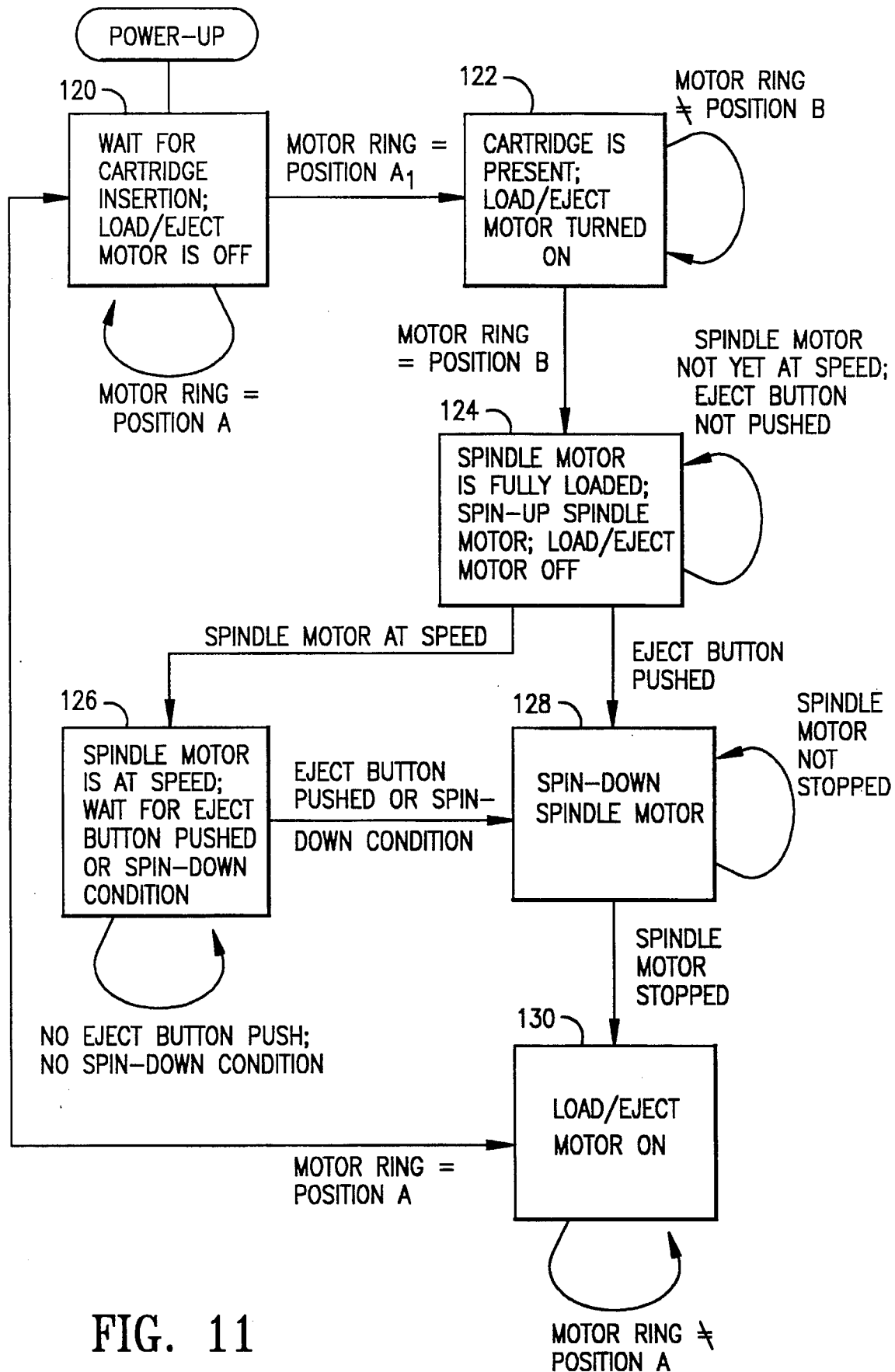
FIG. 11 is a state diagram illustrating further details of the operation of the spindle motor loading mechanism of the present invention.

FIG. 11 is a state diagram illustrating further details of the operation of the present invention, and in particular, the operation of microprocessor 92. Upon power-up of the disk drive 20, the microprocessor 92 enters an initial state 120. At state 120, the microprocessor waits for a cartridge to be inserted into the drive. Until a cartridge is inserted into the drive, the motor ring is at position A (FIG. 8), and the load/eject motor 74 is turned off.

As explained above, upon insertion of a cartridge into the disk drive, the motor ring 66 is disengaged from the eject lever 50 and quickly rotates under the force of motor ring spring 71 until it reaches intermediate position $A_1$. The microprocessor 92 senses, at input 94, the voltage change associated with this initial motor ring rotation and enters state 122.

At state 122, the microprocessor 92 assumes that a cartridge is present in the disk drive and switches on the load/eject motor 74. This causes the motor ring 66 to rotate toward its fully loaded position, i.e., position B. As the motor ring rotates toward position B, the microprocessor 92 continuously samples the voltage at its input 94. For example, the microprocessor 92 may sample the voltage every 25 msec. As explained above, as the motor ring 66 reaches position B, it begins to rotate slightly back in the opposite direction causing a voltage minimum to be detected by the microprocessor 92. In response to this voltage minimum, the microprocessor enters state 124 and turns the load/eject motor off. At this point, the motor ring 66 is in position B (FIG. 8), and the spindle motor is fully loaded. The microprocessor 92 then initiates spin-up of the spindle motor.

The microprocessor 92 remains in state 124 until either the spindle motor reaches its full operating speed (i.e., 5400 rpm) or the user pushes the eject button 26 on the front panel 24 of the disk drive 20. Assuming that the spindle motor reaches its full operating speed before the user pushes the eject button 26, the microprocessor enters state 126.

At state 126, the microprocessor controls various functions incident to normal operation of the disk drive. The microprocessor 92 remains in state 126 until either the eject button 26 is pushed, or a spin-down condition arises due to an operational error detected by the microprocessor 92 or associated drive circuitry, or a spin-down command is received from the host computer. If the eject button 26 is pushed or a spin-down condition is detected, the microprocessor enters state 128. As also shown, the microprocessor 92 may enter state 128 from state 124 if the eject button 26 is pushed before the spindle motor reaches its full operating speed.

At state 128, the disk drive 20 initiates ejection of the disk cartridge by signaling the spindle motor to spin-down to a stopped position. The microprocessor 92 remains in state 128 until it detects that the spindle motor has come to a complete stop. The microprocessor 92 then enters state 130.

At state 130, the microprocessor 92 turns on the load/eject motor 74 which, as described above, causes the motor ring to begin to rotate back to position A. As the motor ring 66 rotates toward position A, the spindle motor 110 is translated downwardly out of engagement with the hub of the disk cartridge, as described above. The microprocessor 92 monitors the voltage output from the position transducer 87 as the motor ring 66 rotates. As explained above, as the motor ring 66 reaches position A, it springs back slightly causing a voltage maximum point output from the position transducer 87. The microprocessor 92 senses this voltage maximum at its input 94 and, in response, returns to state 120 where the load/eject motor 74 is turned off. At this point, the cartridge has been ejected from the disk drive and the disk drive 20 is ready to receive another cartridge or to be powered down.

As the foregoing illustrates, the present invention is directed to disk drive having an automatic spindle motor loading mechanism. It is understood that changes may be made to the embodiments described above without departing from the broad inventive concepts thereof. For example, while the pins 104 and cam slots 106a–c are shown formed on the spindle motor housing 112 and motor ring 66, respectively, this could be reversed. Also, the clockwise and counter-clockwise rotational directions of the motor ring 66 and final gear 82 described herein represent a preferred embodiment and are not meant to be limiting. These directions could be reversed in other embodiments. Additionally, while the microprocessor 92 senses voltage maximum and minimum points of the output signal of the position transducer 87 in order to determine when to turn the load/eject motor 74 on and off in the preferred embodiment, the microprocessor 92 could employ the output signal of the position transducer 87 in other ways. For example, the position transducer 87 could be calibrated so that the microprocessor 92 could look for specific voltages or ranges of voltages in determining the position of the motor ring 66. Accordingly, the present invention is not limited to the particular embodiments disclosed, but is intended to cover all modifications that are within the spirit and scope of the invention as defined by the appended claims.

What is claimed is:

1. A disk drive for writing and reading data to and from a disk contained in a cartridge which is inserted through an opening into said disk drive comprising:

a motor ring rotatably mounted in the disk drive;

a spindle motor adapted to engage a hub of the disk and to rotate the disk, said spindle motor being mounted in said motor ring such that rotation of said motor ring moves said spindle motor into and out of engagement with the hub of the disk cartridge; and a position transducer for providing an output signal indicative of the rotational position of said motor ring.

2. The disk drive recited in claim 1 further comprising a load/eject motor mechanically coupled to said motor ring for rotating said motor ring.

3. The disk drive recited in claim 2 wherein said load/eject motor is responsive to the output signal of said position transducer for controlling the rotation of said motor ring based upon the rotational position thereof.

4. The disk drive recited in claim 1 wherein said position transducer comprises:
   an elongate resistive ink trace printed on a surface within said disk drive and having first and second ends, the first end of said resistive ink trace being connected to a voltage source and the second end being connected to a ground potential;
   a contact element fixedly mounted on said motor ring and positioned thereon in sliding contact with said resistive ink trace between the first and second ends thereof, said contact element operating to slide between the first and second ends of said resistive ink trace as the motor ring rotates between engaged and disengaged positions of the spindle motor, a voltage signal at said contact element defining said output signal and being indicative of the rotational position of the motor ring.

5. The disk drive recited in claim 1 wherein one of said motor ring and a housing of said spindle motor has a plurality of pins extending therefrom, and the other of said motor ring and said housing has a plurality of cam slots for receiving said pins, said pins operating to follow said cam slots as said motor ring rotates in order to move said spindle motor into and out of engagement with the hub of said disk cartridge.

6. The disk drive recited in claim 1 wherein said load/eject motor is operatively coupled to said motor ring via a gear train that translates movement of said load/eject motor into rotation of said motor ring.

7. A disk drive for writing and reading data to and from a disk contained in a cartridge which is inserted through an opening into said disk drive comprising:
   a motor ring rotatably mounted in the disk drive;
   a spindle motor adapted to engage a hub of the disk and to rotate the disk, said spindle motor being mounted in said motor ring such that rotation of said motor ring in a first direction moves said spindle motor into engagement with the hub of the disk cartridge and opposite rotation of said motor ring moves said spindle motor out of engagement with the hub;
   a load/eject motor operatively coupled to said motor ring and adapted to rotate said motor ring in said first and opposite directions; and
   a position transducer for providing an output signal indicative of the rotational position of said motor ring.

8. The disk drive recited in claim 7 further comprising a controller for controlling said load/eject motor in response to the output signal of said position transducer.

9. The disk drive recited in claim 8 further comprising:
   a spring coupled to said motor ring for biasing said motor ring in said first direction of rotation;
   a cartridge eject lever pivotally mounted in said disk drive and adapted to engage a pin on said motor ring when a cartridge is not inserted in the disk drive to prevent rotation of said motor ring in the first direction under force of said spring, said lever being pushed out of engagement with the pin of said motor ring when a cartridge is inserted into the disk drive thereby allowing said motor ring to rotate automatically in said first direction to an intermediate position under force of said spring,
   said controller receiving the output signal from said position transducer, which output signal is indicative of the intermediate position of said motor ring, and, in response thereto, activating said load/eject motor in order to continue rotating said motor ring from said intermediate position to a position in which said spindle motor engages the hub of the disk in said cartridge.

10. The disk drive recited in claim 8 further comprising an eject switch electrically connected to said controller, said controller being adapted to sense the operation of said switch by a user and, in response thereto, to activate the load/eject motor to rotate said motor ring in said opposite direction in order to disengage said spindle motor from said disk.

11. The disk drive recited in claim 7 wherein said position transducer comprises:
    an elongate resistive ink trace printed on a surface within said disk drive and having first and second ends, the first end of said resistive ink trace being connected to a voltage source and the second end being connected to a ground potential;
    a contact element fixedly mounted on said motor ring and positioned thereon in sliding contact with said resistive ink trace between the first and second ends thereof, said contact element operating to slide between the first and second ends of said resistive ink trace as the motor ring rotates between engaged and disengaged positions of the spindle motor, a voltage signal at said contact element defining said output signals and being indicative of the rotational position of the motor ring.

12. The disk drive recited in claim 11 wherein said controller has an input electrically connected to said contact element for receiving the voltage signal at said contact element and for converting the voltage to a digital value indicative of the magnitude thereof.

13. The disk drive recited in claim 12 wherein said controller comprises a microprocessor.

14. The disk drive recited in claim 7 wherein one of said motor ring and a housing of said spindle motor has a plurality of pins extending therefrom, and the other of said motor ring and said housing has a plurality of cam slots for receiving said pins, said pins operating to follow said cam slots as said motor ring rotates in order to move said spindle motor into and out of engagement with the hub of said disk cartridge.

15. The disk drive recited in claim 7 wherein said load/eject motor is operatively coupled to said motor ring via a gear train that translates movement of said load/eject motor into rotation of said motor ring.

16. The disk drive recited in claim 15 wherein a final gear of said gear train has a drive pin that engages a load cam surface of said motor ring as said final gear rotates in order to rotate said motor ring in said first direction.

17. The disk drive recited in claim 16 wherein said motor ring has an eject cam surface, and wherein continued rotation of the final gear of said gear train causes the drive pin of the final gear to engage the eject cam surface of the motor ring and thereby to rotate the motor ring in the opposite direction to disengage the spindle motor from the hub of the disk cartridge.

18. A disk drive for writing and reading data to and from a disk contained in a cartridge which is inserted through an opening into said disk drive comprising:
    a motor ring rotatably mounted in the disk drive;
    a spindle motor adapted to engage a hub of the disk and to rotate the disk, said spindle motor being mounted in said motor ring such that rotation of said motor ring in a first direction moves said spindle motor into engagement with the hub of the disk cartridge and opposite rotation of said motor ring moves said spindle motor out of engagement with the hub;
    a load/eject motor operatively coupled to said motor ring and adapted to rotate said motor ring in said first and opposite directions;

a position transducer that generates an output signal indicative of the rotational position of said motor ring; and a controller for controlling said load/eject motor in response to the output signal of said position transducer.

19. The disk drive recited in claim 18 further comprising:

a spring coupled to said motor ring for biasing said motor ring in said first direction of rotation;

a cartridge load/eject lever pivotally mounted in said disk drive and adapted to engage a pin on said motor ring when a cartridge is not inserted in the disk drive to prevent rotation of said motor ring in the first direction under force of said spring, said lever being pushed out of engagement with the pin of said motor ring when a cartridge is inserted into the disk drive thereby allowing said motor ring to rotate automatically in said first direction to an intermediate position under force of said spring, said controller receiving the output signal from said position transducer, which output signals is indicative of the intermediate position of said motor ring, and, in response thereto, activating said load/eject motor in order to continue rotating said motor ring from said intermediate position to a position in which said spindle motor engages the hub of the disk in said cartridge.

20. The disk drive recited in claim 18 wherein said position transducer comprises:

an elongate resistive ink trace printed on a surface within said disk drive and having first and second ends, the first end of said resistive ink trace being connected to a voltage source and the second end being connected to a ground potential;

a contact element fixedly mounted on said motor ring and positioned thereon in sliding contact with said resistive ink trace between the first and second ends thereof, said contact element operating to slide between the first and second ends of said resistive ink trace as the motor ring rotates between engaged and disengaged positions of the spindle motor, a voltage signal at said contact element defining said output signal and being indicative of the rotational position of the motor ring.

21. The disk drive recited in claim 20 wherein said controller has an input electrically connected to said contact element for receiving the voltage signal at said contact element and for converting the voltage to a digital value indicative of the magnitude thereof.

22. The disk drive recited in claim 21 wherein said controller comprises a microprocessor.

23. The disk drive recited in claim 18 wherein one of said motor ring and a housing of said spindle motor has a plurality of pins extending therefrom, and the other of said motor ring and said housing has a plurality of cam slots for receiving said pins, said pins operating to follow said cam slots as said motor ring rotates in order to move said spindle motor into and out of engagement with the hub of said disk cartridge.

24. The disk drive recited in claim 18 wherein said load/eject motor is operatively coupled to said motor ring via a gear train that translates movement of said load/eject motor into rotation of said motor ring.

25. The disk drive recited in claim 24 wherein said motor ring has a load cam surface and an eject cam surface and wherein a final gear of said gear train has a drive pin that engages said load cam surface and said eject cam surface at respective angles of rotation of said final gear in order to rotate said motor ring in said first and opposite directions, respectively.

26. The disk drive recited in claim 25 further comprising an eject switch electrically connected to said controller, said controller being adapted to sense the operation of said switch by a user and, in response thereto, to activate the load/eject motor to rotate said motor ring in said opposite direction in order to disengage said spindle motor from said disk.

* * * * *